United States Patent Office 3,577,336
Patented May 4, 1971

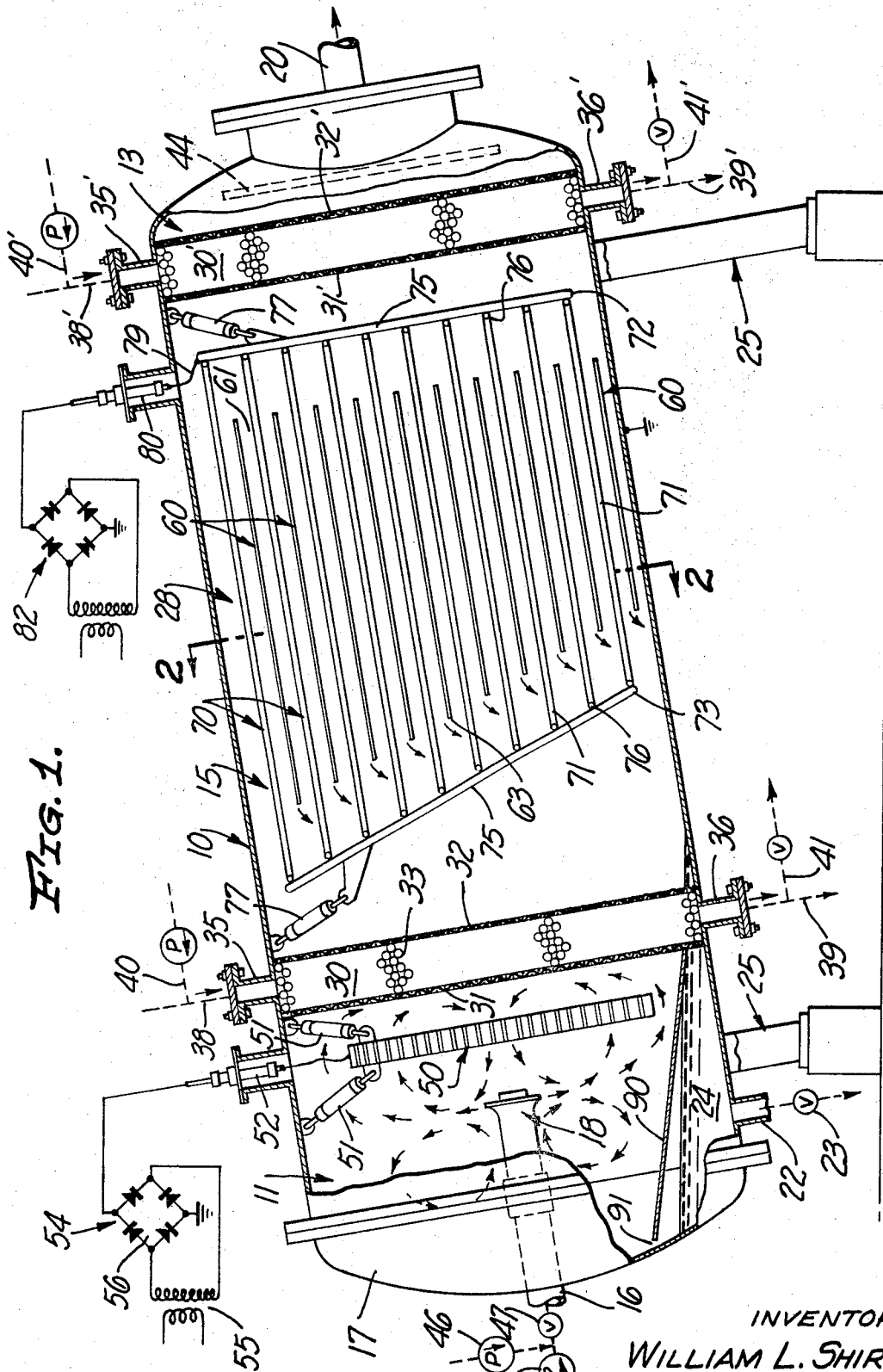

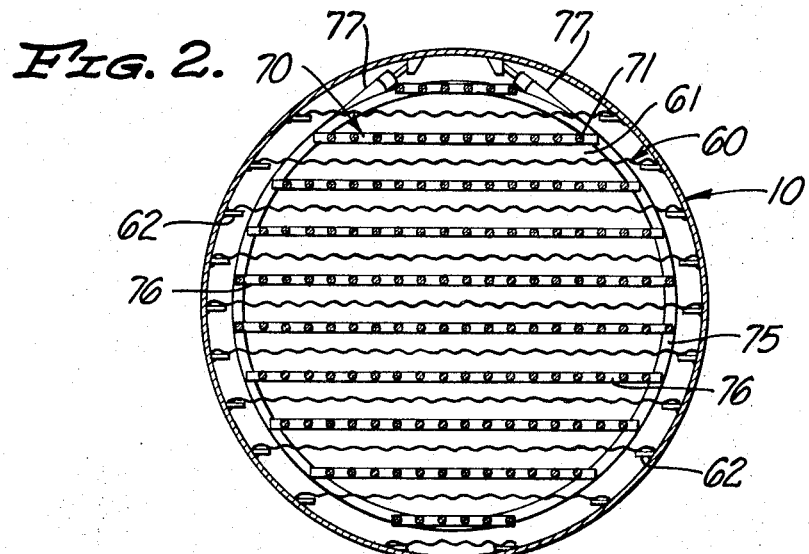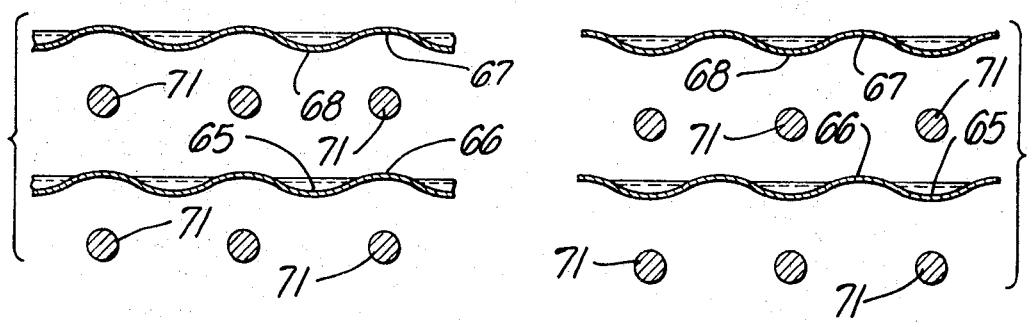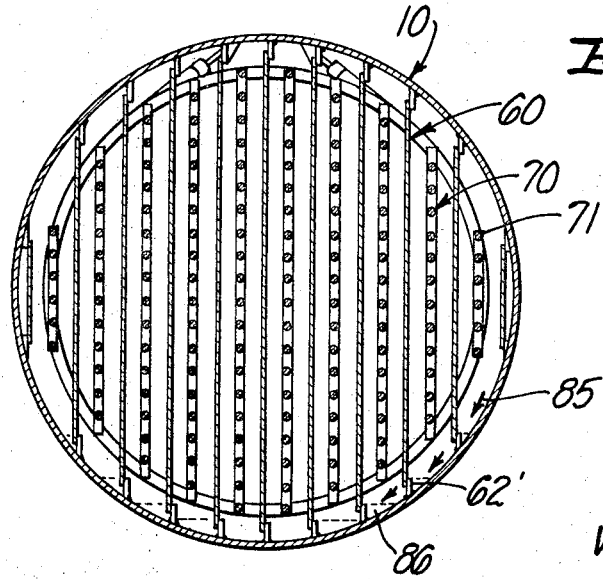

3,577,336
ELECTRIC TREATER FOR TREATING JET FUEL AND OTHER DISPERSIONS
William L. Shirley, Houston, Tex., assignor to Petrolite Corporation, St. Louis, Mo.
Filed Aug. 23, 1968, Ser. No. 754,847
Int. Cl. B03c 5/02
U.S. Cl. 204—302                                              23 Claims

ABSTRACT OF THE DISCLOSURE

An electric treater for removing dispersed materials from oil flowing through electric fields in side-by-side flow passages that are other than vertical. Grid electrodes having side-by-side rods are disposed in the central planes of the flow passages. With such or other electrode configurations in an electric treating chamber, oil flows into or from the latter through a space packed with masses, usually solids, that can be continuously or periodically replaced. The masses may have surface properties or coatings facilitating the separation of the dispersed material from the oil or such masses or materials coating or impregnating same may be reactive with some component of the oil.

---

The invention relates primarily to the electric treatment of oils to remove therefrom dispersed materials. Electrodes of various configuration have been proposed for establishing electric fields effective for this purpose. Field patterns radiating from long rod-like electrodes to opposed electrodes surfaces that are substantially planar have been found to be very effective. If some or all of the dispersed material in the oil is in the form of small liquid droplets the more concentrated electric fields adjacent the rod electrodes are particularly effective in coalescing these droplets into larger droplets or masses of sufficient size to gravitate from the oil.

It is an object of the invention to provide an electric treater in which the oil flows through side-by-side flow passages that extend other than vertically, there being planar grid electrodes extending along the central planes of the flow passages. The flow passages are between planar grounded electrodes and each grid electrode comprises a large number of spaced rods disposed side by side in the plane of the grid electrode.

Other advantages are gained by using planar grounded electrodes and planar grid electrodes that lie in planes extending generally horizontally across a container and it is an object of the invention in a preferred embodiment to provide such an electrode arrangement. With this arrangement such planes may be horizontal or inclined but in either event any material coalesced in a flow passage need settle only a short distance to the lower of the two grounded electrodes forming the flow passage. In a preferred embodiment of the invention each such lower electrode provides an upwardly-facing collection surface spaced only a short distance below the rods of a corresponding horizontal grid electrode. The coalesced material drops to such a collection surface and is guided thereby to a discharge edge of the electrode. Separation of the dispersed material from the oil is thus facilitated.

Further advantages can be obtained by using a collection surface that provides upwardly-open channels parallel to the rods of the planar grid electrode thereabove, these channels containing ribbons of the liquid resulting from settling of coalesced droplets of the dispersed material through the oil toward the collection surface. It is an object of the invention to provide a collection surface with such channels. Another object of the invention is to space the channels equal to the rod spacing and disposed the channels in predetermined parallel relation to the rods.

According to one feature of the invention the electrodes of the above plate-and-rod type or of any conventional type can be disposed in an electric treating chamber that is positioned between an inlet zone and an outlet zone of a container. In any such arrangement it is an object of the invention to provide a mass-holding space between the treating chamber and one or both of such zones with the space being bounded by foraminous members and packed with discrete masses in contact with each other, the resulting composite mass having interstices through which the oil passes into or form the electric treating chamber. A further object is to provide each such space with an inlet at its top for introduction of such masses thereinto and an outlet at its bottom for removal of such masses therefrom.

If such a packed space is provided at the inlet end of an electric treating chamber it will act to distribute the oil equally to different portions of the cross section of the treating chamber. It can also be designed to act as a filter to remove some of the dispersed material before the oil reaches the electrodes or as a coalescer to preliminarily coalesce liquid droplets in a way to facilitate later coalescence by electric forces. The surface properties of the material of such masses in such a space can be such as to react with some component of the oil. In other instances the masses in such a packed space can serve as a vehicle by which a liquid reagent is brought into contact with the oil to react with some component thereof before the oil enters the electric field. For example, the reagent may be made to coat or permeate the masses by flowing the reagent through the packed mass, often in a direction transverse to the direction in which the oil flows through the space. Such a flow of reagent can be continued during the oil flow or can alternate therewith. It is an object of the invention to employ a mass-packed space between an inlet zone and an electric treating chamber to perform one or more of the above functions.

Likewise it is advantageous to employ such a mass-packed space at the outlet end of an electric treating chamber whereby the treated oil flows through the interstices of the composite mass in reaching the outlet zone. Used with the previously-mentioned space at the entrance end of the treating chamber the two packed spaces provide uniform flow across all or desired portions of the treating chamber. A mass-packed space between the treating chamber and the outlet zone can also be made to facilitate effective treatment of the oil. For example, the masses may have desiccant properties or may have desiccant coatings, in which event residual aqueous material in the treated oil can be removed. The same result may be obtained by packing such a space with masses or chunks of so-called open-pore foam made of a plastic (e.g. open-pore polyurethane foam), masses of stainless steel wool or chunks of stainless steel or masses or chunks of fibrous material, cotton, plastics having wax-like surfaces such a polytetrafluoroethylene (Teflon), polytrifluorochloroethylene (Kel–F) or polypropylene, or plastics of the general type described for the tubular member in the United States patent to Turner, No. 3,303,262. In some instances the masses in such a space or surface coatings thereon can be reactive with some component of the oil, a for example when they are masses of solid caustic adapted to neutralize residual acidity of a treated oil. In other instances a liquid reagent may be used to coat or permeate the masses, the flow of reagent through the space being continued during the oil flow or alternating therewith. It is an object of the invention to employ a mass-packed space between an electric treating chamber and an outlet zone to perform one or more of the above functions.

Further objects and advantages of the invention will be evident to those skilled in the art from the following description of exemplary embodiments.

Referring to the drawing, FIG. 1 is a vertical sectional view of one embodiment of the invention. FIG. 2 is a transverse sectional view taken along the line 2—2 of FIG. 1 while FIG. 3 is an enlarged fragment of FIG. 2. FIG. 4 is a view similar to FIG. 3 showing an alternative positioning of the two electrode sysems. FIG. 5 is a transverse sectional view similar to FIG. 2 but showing a different orientation of the electrode systems.

Referring particularly to FIG. 1 the illustrated embodiment of the invention includes a container 10 having at different positions therein an inlet zone 11 and an outlet zone 13 with an electric treating chamber 15 therebetween. There is an oil inlet means delivering the oil to be treated to the inlet zone. This is exemplified as an oil inlet pipe 16 extending through a domed head 17 of the container to a distributor 18 in the inlet zone 11. There is an oil outlet means withdrawing treated oil from the outlet zone 13, here exemplified as an oil outlet pipe 20 which may be equipped with any suitable back-pressure valve controlling the effluent flow of treated oil to maintain a superatmospheric pressure in the container 10. If dispersed liquids are to be removed from the oil the invention provides a dispersed-material outlet 22 from the bottom of the container for discharging continuously or periodically the dispersed material separating from the oil in the container. This outlet is equipped with the usual valve 23 which can be manually operated or automatically controlled in known manner to maintain in the bottom of the container a body 24 of the dispersed material that has separated from the oil in the container.

In accordance with the invention, the flow of oil in the treating chamber 15 and while subjected to the electric fields to be described should be in a direction other than vertical. In the illustrated embodiment this flow direction is axially of the container 10 which is elongated in the flow direction. Such a container can be horizontal or inclined from the horizontal at any angle that is significantly less than 90°. Preferably the invention utilizes supports 25 mounting the container at an angle of about 1–30° from the horizontal and preferably inclined upward from its entrance end.

An electrode means 28, later described in detail, is positioned in the treating chamber 15. Its purpose is to aid separation of dispersed materials from the oil. If the dispersed material is in the form of small drops of liquid the electrode means 28 will coalesce these into larger masses that will settle in the oil and ultimately reach the body 24. If the dispersed materail comprises small solid particles these may deposit on the electrode means and be subquently removed therefrom. If the dispersed material comprises both solid and liquid materials the solids will ordinarily settle with the coalesced liquid and be withdrawn therewith through the dispersed-material outlet 22.

Between the inlet zone 11 and the treating chamber 15 is a mass-containing space 30 bounded by an upright foraminous member 31 facing and forming one boundary of the inlet zone 11 and by an upright foraminous member 32 facing and forming one boundary of the treating chamber 15. This space 30 is packed with discrete masses 33 with spaces therebetween or therethrough transmitting oil in a direction toward the treating chamber 15. The shape and average size of these masses is not critical but it is preferred to use marble-size masses of glass, mineral substances, metal or other solid material in round, oblate or other shape with no sharp corners or edges or in such shape as will provide sharp corners, edges or projections. The masses 33 may be introduced through an inlet 35 at the top of the space 30 and may be removed from the bottom of this space through an outlet 36. Both the inlet 35 and the outlet 36 are shown as flanged collars closed by removable plates. The foramina of the foraminous members 31 and 32 may be throughout the areas thereof or can be confined to areas in which it is desired that the oil exude into the treating chamber 15.

The masses 33 in the space 30 form a composite or packed mass that is static during use, being replaced only at long intervals, or it may be mobile if some of the masses 33 are continually removed therefrom and others are added. These masses may be introduced through a pipe 38 opening on the inlet 35 and may be withdrawn through a pipe 39 opening on the outlet 36. In some instances it is desirable to supply a liquid to the space 30 to coat or impregnate the masses 33. Such a liquid can be introduced into the pipe 38 through a line 40. If a continuous flow of such liquid through the space 30 is desired the liquid can be removed through a pipe 41 communicating with the pipe 39. The delivery of such liquid or such masses to the space 30 and the corresponding withdrawal therefrom can be continuous, intermittent or as needed.

Likewise, a mass-containing space 30' is formed between foraminous members 31' and 32' respectively facing and bounding the treating chamber 15 and the outlet zone 13. Inlets and outlets for the masses and/or liquid are similar to those described with reference to the space 30 and are indicated by corresponding primed numerals. As before, the foramina of the members 31' and 32' are disposed in areas where the treated oil is to leave the treating chamber 15 and enter the outlet zone 13. If desired, a plate 44 in the outlet zone 13 can serve as a baffle guiding the treated oil to flow therearound on its way to the oil outlet pipe 20.

The oil to be treated may be pressured by a pump 45 for delivery to the distributor 18 through the oil inlet pipe 16. It is often desirable to mix a liquid with this oil to facilitate the removal therefrom of constituents that are dissolved and/or dispersed therein. Such a liquid can be pressured by a pump 46, supplied to the oil inlet pipe 16 and mixed therein with the oil by a valve 47 or other mixing device. The liquid is usually water or an aqueous solution.

As an optional feature, a pretreat electrode 50 can be suspended in the inlet zone 11 by insulators 51. This electrode is energized through a conductor that passes through a bushing 52 and is connected to a source of potential 54. This potential source is shown as a high-voltage unidirectional source in which the high voltage from a step-up transformer 55 is rectified by a full-wave rectifier 56 having one output terminal connected to the aforesaid conductor and another connected to ground and thus to the container 10. Either an alternating-current or unidirectional-current source 54 can be employed for energizing the pretreating electrode 50 and maintaining electric fields at its periphery or its faces. An electric field that is particularly effective for pretreating the oil is established between the opposed faces of the electrode 50 and the foraminous member 31.

The distributor 18 is of a type that will flow the oil through such a field before it enters the mass-containing space 30. Suggested in FIG. 1 is a known type of spring-loaded distributor discharging the oil to flow radially outward as a thin sheet. Such a distributor establishes recirculations in the inlet zone 11 with some of these linking the pretreat electrode 50. The latter is desirably foraminous and may be made up of a series of concentric rings as suggested in FIG. 1. Other types of electrodes can however be used and in many instances the use of a pretreat electrode 50 is not necessary.

The illustrated electrode means 28 includes a plurality of superimposed planar grounded electrodes 60 extending in the flow direction and defining therebetween horizontally-wide and vertically-narrow flow passages 61 of substantial length in the flow direction, these flow passages having entrance and exit ends respectively communicating with the inlet and outlet zones 11 and 13. The grounded electrodes 60 may extend partially or wholly across the container between opposite walls thereof. In the illustrated embodiment these electrodes extend along chords of the cylindrical container with their side edges resting on longitudinal supports 62 attached to the container, see FIG. 2.

Desirably such parallel electrodes 60 occupy a large portion of the length of the treating chamber 15, measured in the flow direction, but they may be of varying length as suggested in FIG. 1 so that the dispersed-phase material in the flow passages that settles to an upper collection surface of any grounded electrode may drop from a discharge edge 63 thereof in free fall through the oil toward the bottom of the container without contacting any grounded electrode therebelow.

The planar grounded electrodes 60 may be flat plates, that may be vertical as suggested in FIG. 5, or that may be horizontal or inclined as in FIG. 1. Preferably however these planar grounded electrodes are made of corrugated material with the corrugations running in the flow direction, see FIGS. 2-4. In this instance a typical grounded electrode will have an upper substantially-impervious collection surface having upwardly-open channels 65 and upwardly-facing crests 66 extending in the flow direction. Such channels 65 collect and carry ribbons of the dispersed-phase material settling in the flow passages. The liquid of these ribbons drops from the discharge edge 63 as aforesaid but if this discharge edge is likewise of corrugated shape the liquid discharge is localized and occurs in narrow streams or a series of discrete droplets discharged from the ends of the channels 65.

Likewise a typical grounded electrode will have a downwardly-facing electrode surface bounding the top of a corresponding flow passage and toward which electrode surface the treated oil of the dispersion rises. If the grounded electrode is made of corrugated material this downwardly-facing electrode surface will provide channels 67 into which the treated oil rises so that the oil is guided by such channels in its flow toward the outlet zone 13. There will be downwardly-facing crests 68 between such channels.

The electrode means 28 includes also a plurality of planar grid electrodes 70 with each such electrode comprising a large number of spaced rods 71 (FIG. 2) disposed side by side in the central plane of a corresponding flow passage. These rods should extend in the flow direction and preferably parallel to the channels of any corrugated grounded electrode 60 therebelow.

Two relative positions of the rods 71 and the corrugations are possible, respectively shown in FIGS. 3 and 4. The preferred arrangement is shown in FIG. 3 in which each rod 71 is oriented above and parallel to one of the upwardly-facing crests 66 of the grounded electrode therebelow. That portion of the electric field below the rod will thus be between the rod and the crest 66 with some portions of this field existing between the rod and the ribbons of liquid in the two channels 65 on opposite sides of the crest. Any dispersed droplets of the dispersion that are coalesced between the rod 71 and the crest 66 will need move laterally only a very small distance before joining a ribbon in the channels on opposite sides of the crest. With this orientation of the electrodes it will be noted that each rod electrode 71 is below a corresponding channel 67 of the grounded electrode thereabove. The upper portion of the field adjacent each rod thus radiates from the rod to a concave surface. Field portions of this type above and below each rod appear to give the best results in practice. This arrangement is desirable also because the ribbons of liquid in the channels 65 discharge at the discharge edge 63 in positions that are between the energized rods 71 that are therebelow, thus avoiding any danger of short circuiting the electrodes.

In the alternative arrangement of FIG. 4, each rod 71 is above a corresponding channel 65 and the lower portion of the field is between the rod and any ribbon of liquid in this channel. The upper portion of the field is between the rod and a corresponding downwardly-facing crest 68 of the electrode thereabove. An undesirable feature of the arrangement of FIG. 4 is that the ribbons of liquid discharge from the channels 65 respectively at positions above the energized rod electrodes 71 therebelow so that a drop-by-drop discharge is desirable to avoid the possibility of short-circuiting.

To permit the establishing of electric fields in the inter-electrode spaces, the invention provides means for electrically insulating the planar grid electrodes 70 from the grounded electrodes 60 and from the container 10. As a part of such means the invention employs a mounting structure at one or both ends of the rods 71 of the grid electrode 70. Two mounting structures 72 and 73 are exemplified in FIG. 1 each made up of a rod-support structure to which the corresponding ends of the rods are connected. Each rod-supporting structure should be foraminous so as not to interfere with the flow of liquid along the treating chamber 15. In the preferred construction each such structure includes at least one ring member 75 spaced from one end of the flow passages with strips 76 spanning the ring member. These strips are respectively in the projected central planes of the flow passages and the corresponding end of each rod of a grid electrode is connected to and supported by one of these strips. Each mounting structure 72, 73 is supported by a pair of insulators 77 which position the grid electrodes and stabilize them against lateral movement relative to the corrugations of the grounded electrodes.

A conductor 79 extends through a bushing 80 to a source of potential 82. This source 82 is similar to the source 54 but is desirably almost always a source of high-voltage unidirectional potential.

It is not always essential that the electrodes 60 and 70 be essentially horizontal or parallel to a horizontal line extending between the opposed side walls of the container 10. If less exacting results can be tolerated the planes of these electrodes can be displaced 90° from the position shown in FIG. 2 so that these electrodes are in side-by-side vertical planes as shown in FIG. 5. With the latter orientation the planar grounded electrodes 60 may be made of screen, or corrugated metal as previously described or they may comprise flat parallel plates as illustrated in FIG. 5. In any event their lower edges or the attached longitudinal supports 62' should be such as to permit drainage of settled dispersed-phase material from below the outer flow passages to the bottom of the container as suggested generally by the arrows 85 of FIG. 5. If the now-vertical planar electrodes 60 are formed of screen and if the axis of the container 10 is horizontal or deviates only slightly therefrom the longitudinal supports 62 form troughs 86 with the container wall. These troughs will be at different levels and will contain ribbons of the separated dispersed-phase liquid with an upper surface controlled by the overflow to the next lower trough or by the rate of settling of the dispersed-phase liquid into the trough. Such upper surfaces act as grounded electrodes and desirable fields are created between such surfaces and the lowermost rod 71 of the corresponding grid electrode 70. This again provides a desirable treatment between a rod electrode and a liquid level. If desired the lowermost ends of each trough 86 may be dammed, except for those at or near the bottom of the tank which should be open to permit the collected dispersed-phase liquid to drain to or otherwise become a part of the body 24 of this liquid.

When using a container 10 that is inclined from the horizontal as shown in FIG. 1 the dispersed-phase liquid drains to the body 24 through the lowermost intertices of the masses in the space 30. At the bottom of the inlet zone 11 it is desirable to separate the body 24 from the circulations of the oil that are induced by the distributor 18. A horizontal or slightly-inclined baffle 90 serves this purpose. One end of the baffle meets the foraminous member 31 at a position above the lower wall of the container 10. At its other end, this baffle should provide means for communicaton between the main portion of the inlet zone 11 thereabove and the zone immediately above the body 24. In the illustrated embodiment the opposite end of the baffle 90 terminates short of the head 17 to provide a passage means 91 serving this purpose.

The spacing of the planar electrodes 60 is not critical but will usually be in the range of about 3–12" with the diameters of the rods 71 ranging correspondingly from about .375" to 2" and preferably being in the range of about .5" to 1". For high-voltage treatment employing unidirectional electric fields in the flow passages 61, the source 82 will be of sufficient voltage to maintain an average voltage gradient of about 4–10 kv./inch between each rod and the closest area of an adjoining grounded electrode 70. Alternating or unidirectional fields of the same or a lower voltage gradient can be employed in the inlet zone 11 if pretreatment is desired.

The invention is useful in the treatment of various dispersions. Typical results to be expected from use of the invention are presented in the following paragraphs.

One particularly important use of the invention is in the treatment of jet fuel before entering storage tanks or being pumped into the fuel tanks of a jet plane. Moisture or solid contaminants in such a jet fuel have led to many accidents. Such dispersed materials can be removed from a jet fuel by use of the invention. For example, a jet fuel containing about 1,000 p.p.m. of dispersed water flowing through spaces 30 and 30' packed with glass marbles of a diameter of about ⅜" will discharge from the equipment containing only about 30 p.p.m. of entrained water if subjected to electric treatment between the rods 71 and the grounded electrode 60 in unidirectional electric fields of 10 kv./inch. If the pretreat electrode 50 is energized to establish a field of about 6 kv./inch between this electrode and the foraminous member 31, the treated oil will contain even less residual moisture, e.g. about 10 p.p.m. If a desiccant, such as solid chunks of NaCl, is employed in the mass-containing space 30' the residual entrained moisture can be reduced further, typically to about 3 p.p.m. Use of such a desiccant also in the mass-containing chamber 30 will effect removal of even more of the moisture but the desiccating action is often short-lived and it is usually desirable to rely upon electric action to remove the bulk of the moisture, in which event glass or other solid masses can be used in the chamber 30. Such solid masses or other masses of the type previously described will serve the function of distributing the oil uniformly and often inducing some degree of coalescence before entry into the treating chamber 15. The above-exemplified treatment of jet fuel can be at room temperature or above but it is desirable always to employ the lowest possible temperature to minimize the amount of water actually dissolved in the jet fuel, which dissolved water is not removed by the process except to the degree it is absorbed by use of a disiccant. As concerns the latter, use of a desiccant in the mass-containing space will often reduce the haze point of a distillate up to 20° F.

If the treater is used to remove residual acid from an acid-treated distillate, e.g. a naphtha boiling in the range of 150–350° F. containing about 100 p.p.m. of residual suspended sulfuric acid solution—a system typically produced by mixing therewith and separating therefrom a concentrated solution of sulfuric acid—treatment with fields energized as above and with glass marbles, rock salt, clay masses, bauxite or other non-reactive solids in the chambers 30 and 30' will usually reduce the suspended acidity to about 5 p.p.m. If the chamber 30' is packed with masses of solid caustic or with masses of rock or glass coated therewith the residual acidity can be reduced to about 1 p.p.m. or less.

It will be clear that the electrode means 28, effecting electric treatment between the rods 71 and the other-than-vertical planar grounded electrodes 60, can be used in treating chambers that are not bounded by the one or more mass-containing spaces 30, 30', in which event flow of the oil will be distributed and collected by conventional means. Likewise the mass-containing spaces 30, 30' are useful with other types of electrode means and will serve to distribute the oil uniformly and supplement the action of the electric fields by inducing a precoalescence or by otherwise bettering the separation or treatment desired. It will be apparent also that the invention is not limited to treatment taking place in a cylindrical vessel or a vessel with an inclined axis as it is possible to dispose the planar grounded electrodes 60 and the rods of the grid electrodes 70 in horizontal or inclined planes in other vessels.

I claim:

1. An electric treater adapted for removing dispersed materials from oils, said treater including:
    an elongated container having a central axis that is horizontal or inclined as distinct from being vertical, said container having an inlet zone at one end to which the oil to be treated is delivered, an outlet zone at the other end with an outlet for treated oil, an electric treating chamber between said inlet and outlet zones, and a dispersed-material outlet from the bottom of the container for the dispersed materials separating from the oil in the container;
    a plurality of spaced planar grounded electrodes mounted in said treating chamber parallel to each other and extending longitudinally of the container throughout a large portion of the length of the treating chamber, said planar grounded electrodes providing side-by-side flow passages having entrance and exit ends respectively communicating with said inlet and outlet zones;
    planar grid electrodes in said flow passages extending along central planes thereof, each planar grid electrode comprising a large number of spaced rods disposed side by side in the plane of the grid electrode;
    a mounting structure holding said rods of said grid electrodes in such spaced side-by-side relation in the respective flow passages and insulating the grid electrodes from the container; and
    means for maintaining a potential difference between said grounded electrodes and said grid electrodes to establish oil-treating electric fields therebetween.

2. An electric treater as defined in claim 1 in which the container is cylindrical, and in which the grounded electrodes extend along chords of the container substantially from wall to wall thereof whereby those grounded electrodes near the central axis of the container are wider and of larger surface area than those grounded electrodes spaced further from such central axis, said planar grid electrodes also extending along chords of said container with those grid electrodes near the central axis of the container being wider than those grid electrodes spaced further from such central axis.

3. An electric treater as defined in claim 1 in which said mounting structure includes two rod-supporting structures one between the inlet zone and the entrance ends of the flow passages and the other between the exit ends of the flow passages and the outlet zone, said rods having ends connected to and supported by said rod-supporting structures.

4. An electric treater as defined in claim 1 in which the rods of each planar grid electrode extend longitudinally of the container, and in which said mounting structure includes at least one ring member spaced from one end of said flow passages, and spaced strips spanning the ring member with the strips respectively in the projected central planes of said flow passages, the ends of each rod of a grid electrode being connected to and supported by one of said strips.

5. An electric treater as defined in claim 1 in which the planar grounded electrodes and the planar grid electrodes lie in vertical planes.

6. An electric treater as defined in claim 1 in which the planar grounded electrodes and the planar grid electrodes lie in horizontal or inclined planes extending across the container, each grounded electrode providing a substantially-imperforate upwardly-facing collection surface spaced only a short distance below the rods of a corresponding horizontal grid electrode, the dispersed material of the oil coalesced by the electric fields gravitating to such collection surfaces.

7. An electric treater as defined in claim 6 in which the central axis of the container and the grounded electrodes therein are inclined from the horizontal at an angle sufficient to drain coalesced material settling to said collection surfaces toward the ends of said grounded electrodes, such ends terminating in discharge edges extending horizontally across the container, the horizontal discharge edges of the grounded electrodes lying in a plane inclined from the vertical with each discharge edge terminating beyond an edge therebelow.

8. An electric treater as defined in claim 6 in which each planar grounded electrode is made of corrugated metal with the corrugations extending longitudinally of the container, the corrugated grounded electrode providing channels extending longitudinally of the container formed by the corrugations, said channels receiving bodies of the material coalesced by the electric fields.

9. An electric treater as defined in claim 1 including a mass-containing space bounded by spaced foraminous members traversing said container, one of such foraminous members bounding said treating chamber and the other of such foraminous members bounding one of said zones of said container, an inlet for said space at the top thereof for introducing masses thereinto, and an outlet for said space at the bottom thereof for removing masses therefrom.

10. An electric treater as defined in claim 9 in which said mass-containing space is between said treating chamber and said inlet zone with said other of said foraminous members being an entrance member having foramina for admitting oil from said inlet zone into said space, in which said space is packed with masses with spaces therebetween for transmitting oil to said treating chamber, and in which there is a distributor in said inlet zone for spreading the oil to be treated therein throughout the area of the foramina of said entrance member.

11. An electric treater as defined in claim 1 including a distributor in the inlet zone receiving the oil to be treated, a foraminous member in said container between said inlet zone and said electric treating chamber, a foraminous electrode in said inlet zone at a position between said distributor and said foraminous member and substantially parallel to the latter, means for insulating said foraminous electrode from said container and from said foraminous member, and means for energizing said foraminous electrode to establish a pretreating electric field between the foraminous electrode and the foraminous member.

12. An electric treater adapted for removing dispersed materials from oils, said treater including:
a container having at different positions therein an inlet zone and an outlet zone with an electric treating chamber therebetween, there being an oil inlet means for delivering oil to said inlet zone and an oil outlet means for withdrawing treated oil from said outlet zone, with said container oriented whereby oil flows through said treating chamber in a direction other than vertical when passing from said inlet zone to said outlet zone;
a plurality of superimposed planar grounded electrodes mounted in said electric treating chamber defining therebetween horizontally-wide and transversely-narrow flow passages having entrance and exit ends respectively communicating with said inlet and outlet zones, the grounded electrodes having downwardly-facing electrode surfaces and upwardly-facing collection surfaces respectively forming the upper and lower boundaries of the flow passages;
a plurality of planar grid electrodes in said flow passages, each planar grid electrode comprising a large number of spaced rods disposed side by side in the central plane of a corresponding flow passage; and
means for electrically insulating said grounded electrodes and said grid electrodes from each other and for establishing electric fields in said flow passages between said rods and the upwardly-facing collection surfaces therebelow and the downwardly-facing electrode surfaces thereabove, said electric fields being more concentrated adjacent said rods than adjacent said surfaces.

13. An electric treater as defined in claim 12 in which said collection surfaces have upwardly-open channels parallel to the rods of the planar grid electrode thereabove for containing ribbons of liquid resulting from settling of coalesced droplets through the oil toward the collection surface, so that each of said ribbons acts as a grounded electrode, and with a channel sufficiently close to a rod so that a portion of the electric field is from such rod to the ribbon of liquid in the channel.

14. An electric treater as defined in claim 13 including means for mounting each grounded electrode in said treating chamber to slope downward to a discharge edge thereof with the ribbons of conductive liquid being streams thereof moving along said channels to said discharge edge and dropping therefrom to collect as a body of the conductive liquid in a lower zone of said container, and including an outlet for the liquid in such lower zone.

15. An electric treater as defined in claim 12 in which said planar grounded electrodes are made of corrugated metal with the length of the corrugations parallel to the rods of the grid electrodes to provide (a) upwardly-open channels parallel to the rods of the planar grid electrode thereabove for containing ribbons of liquid resulting from settling of coalesced droplets through the oil toward said collection surface and (b) downwardly-open channels parallel to the rods of a planar grid electrode therebelow for receiving treated oil, with the corrugated-metal grounded electrodes having discharge edges so that the liquid ribbons in said upwardly-open channels may flow thereover.

16. An electric treater as defined in claim 15 in which said corrugated-metal grounded electrodes are inclined downward toward said discharge edges thereof, and in which the rods of each planar grid electrode protrude beyond the discharge edge of the corrugated-metal grounded electrode thereabove, the liquid of the ribbons in the upwardly-open channels of such corrugated-metal grounded electrode thereabove flowing from the discharge edge thereof at positions between the protruding rods of the grid electrode therebelow.

17. An electric treater adapted for removing dispersed material from oils, said treater including:
a container having at different positions therein an inlet zone and an outlet zone with an electric treating chamber therebetween, there being an oil inlet means for delivering oil to said inlet zone and an oil outlet means for withdrawing treated oil from said outlet zone, so that the oil flows through said treating chamber passing from said inlet zone to said outlet zone;
spaced electrode means in said treating chamber and means for establishing an electric field therebetween, whereby said field treats the oil flowing through said treating chamber;
a mass-containing space between said treating chamber and one of said zones, said space being bounded by foraminous members spaced from each other, one of such foraminous members bounding said treating chamber and the other of such foraminous members bounding one of said zones of said container;
an inlet for said space at one position for introducing masses thereinto; and an outlet for said space at another position for removing masses therefrom.

18. An electric treater as defined in claim 17 in which said masses have surfaces reactive with some component of the oil.

19. An electric treater as defined in claim 17 including means for coating or permeating said masses with a reagent reactive with some component of the oil passing through the mass-containing space, said last-named means including means for delivering said reagent to one side of said space to flow therethrough toward the other side thereof in a direction transverse to the direction in which the oil passes through said space.

20. An electric treater as defined in claim 17 in which said space is between said inlet zone and said treating chamber, said space being packed with discrete masses having interstices between the discrete masses of the pack transmitting oil from the inlet zone to said treating chamber.

21. An electric treater as defined in claim 17 in which said space is between said treating chamber and said outlet zone, said space being packed with discrete masses having interstices between the discrete masses of the pack through which the treated oil flows from said treating chamber to said outlet zone.

22. An electric treater as defined in claim 21 in which the masses in said space are masses of a desiccant.

23. An electric treater as defined in claim 21 including means for coating or permeating the masses in said space with a reagent reactive with some component of the treated oil passing through the space on its way to said outlet zone, said last-named means including means for delivering said reagent to one side of said space to flow therethrough toward the other side thereof in a direction transverse to the direction in which treated oil passes through said space.

References Cited
UNITED STATES PATENTS

| | | | |
|---|---|---|---|
| 2,116,509 | 5/1938 | Cottrell | 204—188 |
| 2,245,551 | 6/1941 | Adams et al. | 204—302 |
| 2,823,181 | 2/1958 | Packie et al. | 204—302 |
| 3,148,133 | 9/1964 | Turner | 204—302X |
| 3,342,720 | 9/1967 | Turner | 204—302 |

TA-HSUNG TUNG, Primary Examiner

N. A. KAPLAN, Assistant Examiner

U.S. Cl. X.R.

204—188, 190